US012587702B2

(12) United States Patent (10) Patent No.: US 12,587,702 B2
Nitta (45) Date of Patent: Mar. 24, 2026

(54) TERMINAL APPARATUS, DELIVERY SYSTEM, AND DELIVERY METHOD

(71) Applicant: JVCKENWOOD Corporation, Yokohama (JP)

(72) Inventor: Hirotaka Nitta, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 258 days.

(21) Appl. No.: 18/196,504

(22) Filed: May 12, 2023

(65) Prior Publication Data

US 2023/0283833 A1 Sep. 7, 2023

Related U.S. Application Data

(63) Continuation of application No. PCT/JP2021/032073, filed on Sep. 1, 2021.

(30) Foreign Application Priority Data

Jan. 26, 2021 (JP) ................................. 2021-010205

(51) Int. Cl.
*H04N 7/18* (2006.01)
*H04N 21/431* (2011.01)
(Continued)

(52) U.S. Cl.
CPC ......... *H04N 21/431* (2013.01); *H04N 21/439* (2013.01); *H04N 21/442* (2013.01)

(58) Field of Classification Search
CPC .. H04N 21/431; H04N 21/439; H04N 21/442; H04N 21/2668; H04N 21/41422;
(Continued)

(56) References Cited

U.S. PATENT DOCUMENTS 8,125,334 B1 * 2/2012 Loyal ................... G08B 13/196
340/541
9,324,234 B2 * 4/2016 Ricci ....................... H04W 4/80
(Continued)

FOREIGN PATENT DOCUMENTS

JP H07233651 A 9/1995
JP 2003046974 A 2/2003
JP 2005339479 A 12/2005

OTHER PUBLICATIONS

International Search Report of PCT/JP2021/032073 dated Nov. 16, 2021.

*Primary Examiner* — Annan Q Shang
(74) *Attorney, Agent, or Firm* — PROCOPIO, CORY, HARGREAVES & SAVITCH LLP

(57) ABSTRACT

The terminal apparatus according to the present invention includes an information detection unit configured to detect sound information and so forth of an occupant who appreciates a content at a venue while riding on a vehicle, an information transmission unit configured to transmit the information to a delivery apparatus which totalizes degrees of excitement of the occupants, an information reception unit configured to receive, from the delivery apparatus, a sound source of the content and a picture of the content, on which a predetermined superimposed sound and a predetermined superimposed picture generated based on the excitement degrees are superimposed, and a superimposition output unit configured to output the sound source of the content and the picture of the content which are received.

4 Claims, 14 Drawing Sheets

(51) Int. Cl.
     *H04N 21/439*          (2011.01)
     *H04N 21/442*          (2011.01)
(58) Field of Classification Search
     CPC ........... H04N 21/252; H04N 21/42202; H04N
                    21/42203; H04N 21/4223; H04N
                    21/4394; H04N 21/44008; H04N
                    21/4668; H04N 21/6582; G10L 15/00;
                                                G10L 15/10
     See application file for complete search history.

(56)                    References Cited

U.S. PATENT DOCUMENTS

2015/0061895 A1*    3/2015  Ricci ...................... G06V 40/28
                                                        340/902
2017/0006322 A1*    1/2017  Dury ................... H04N 21/254
2018/0194345 A1*    7/2018  Stefan .................... H04W 4/00

* cited by examiner

TERMINAL APPARATUS, DELIVERY SYSTEM, AND DELIVERY METHOD

CROSS REFERENCE TO RELATED APPLICATION

This application is based upon and claims the benefit of priority from Japanese patent application No. 2021-010205, filed on Jan. 26, 2021, and International application No. PCT/JP2021/032073, filed on Sep. 1, 2021, the disclosure of which is incorporated herein in its entirety by reference.

BACKGROUND

The present invention relates to a terminal apparatus, a delivery system, and a delivery method.

Patent Literature 1 (Japanese Unexamined Patent Application Publication No. 2005-339479) discloses a business model which enables a venue and viewers to achieve a feeling of togetherness. In the business model of Patent Literature 1, reactions which are made by viewers of sports or a concert broadcasted on television or a website by using terminals such as remote controllers, personal computers, and cellular phones are collected through the Internet in real time and are reflected in an event venue in a form of cheers, graphs, or the like in real time as well.

Patent Literature 2 (Japanese Unexamined Patent Application Publication No. 2003-046974) discloses a movie display system. The movie display system of Patent Literature 2 causes live image display means acquired from a live movie server to display a live image and causes browsing persons to view a movie with reality.

Patent Literature 3 (Japanese Unexamined Patent Application Publication No. H07-233651) discloses a drive-in video theater.

In the drive-in video theater of Patent Literature 3, an audience can enter a room while riding on an automobile and can see a film without taking troublesome procedures or seeing other persons and while feeling free and protecting his/her privacy.

SUMMARY

In recent years, due to spread of coronavirus, various events such as music live concerts and festivals have been canceled. In order to avoid crowds, live delivery of music live concerts on the Internet have been increasing. As in Patent Literatures 1 and 2, movies on the Internet have not yet reached a level where audiences sufficiently have a sense of presence or a sense of unity. Further, as in Patent Literature 3, a drive-in video theater which an audience can enter while riding on an automobile does not reflect reactions of audiences, and it is difficult to achieve a sense of presence or a sense of unity.

The present embodiment has been made for solving such problems, and an object thereof is to provide a terminal apparatus, a delivery system, and a delivery method which can improve a sense of presence or a sense of unity in a music live concert or the like while maintaining a certain distance from another person.

Accordingly, the present embodiment provides a terminal apparatus including: an information detection unit configured to detect at least any information among sound information and picture information of an occupant who appreciates a content at a venue while riding on a vehicle and vehicle information which indicates a state of the vehicle; an information transmission unit configured to transmit the information to a delivery apparatus which totalizes degrees of excitement of occupants with respect to a plurality of vehicles at the venue, the degrees of excitement being generated in accordance with the information; an information reception unit configured to receive, from the delivery apparatus, a sound source of the content and a picture of the content, on which at least either one of a predetermined superimposed sound and a predetermined superimposed picture is superimposed, the predetermined superimposed sound and the predetermined superimposed picture being generated by the delivery apparatus based on the excitement degrees totalized by the delivery apparatus; and a superimposition output unit configured to output at least either one of the sound source of the content and the picture of the content which are received, in which an excitement region in which the occupant with a high excitement degree is positioned is specified by the delivery apparatus based on arrangement information of the vehicles parked at the venue, and the superimposition output unit outputs the superimposed sound and the superimposed picture such that at least either one of a condition where the occupant hears the superimposed sound from a direction of the excitement region and a condition where the occupant sees the superimposed picture in the direction of the excitement region is established in accordance with a positional relationship between the vehicle and the excitement region.

Further, the present embodiment provides a terminal apparatus including: an information detection unit configured to detect at least any information among sound information and picture information of an occupant who appreciates a content at a venue while riding on a vehicle and vehicle information which indicates a state of the vehicle; an excitement degree generation unit configured to generate a degree of excitement of the occupant in accordance with the information; an information transmission unit configured to transmit the generated excitement degree to a delivery apparatus which totalizes excitement degrees with respect to a plurality of vehicles at the venue; an information reception unit configured to receive, from the delivery apparatus, a sound source of the content and a picture of the content, on which at least either one of a predetermined superimposed sound and a predetermined superimposed picture is superimposed, the predetermined superimposed sound and the predetermined superimposed picture being generated based on the excitement degrees totalized by the delivery apparatus; and a superimposition output unit configured to output at least either one of the sound source of the content and the picture of the content which are received, in which an excitement region in which the occupant with a high excitement degree is positioned is specified by the delivery apparatus based on arrangement information of the vehicles parked at the venue, and the superimposition output unit outputs the superimposed sound and the superimposed picture such that at least either one of a condition where the occupant hears the superimposed sound from a direction of the excitement region and a condition where the occupant sees the superimposed picture in the direction of the excitement region is established in accordance with a positional relationship between the vehicle and the excitement region.

In addition, the present embodiment provides a delivery system including: a terminal apparatus being arranged in each vehicle in a venue at which a plurality of vehicles are parked, the terminal apparatus having an information detection unit configured to detect at least any information among sound information and picture information of an occupant who appreciates a content while riding on the vehicle and vehicle information which indicates a state of the vehicle;

and a delivery apparatus having an excitement degree totalization unit configured to totalize degrees of excitement of occupants with respect to the plurality of vehicles, the degrees of excitement being generated in accordance with the information, the excitement degree totalization unit being configured to specify an excitement region in which the occupant with a high excitement degree is positioned based on arrangement information of the vehicles parked at the venue, in which the delivery apparatus further has a delivery unit configured to deliver, to each of the terminal apparatuses, a sound source of the content and a picture of the content, on which at least either one of a predetermined superimposed sound and a predetermined superimposed picture is superimposed, the predetermined superimposed sound and the predetermined superimposed picture being generated based on the totalized excitement degrees of the vehicles, and each of the terminal apparatuses further has a superimposition output unit configured to output the superimposed sound and the superimposed picture such that at least either one of a condition where the occupant of each of the vehicles hears the predetermined superimposed sound from a direction of the excitement region and a condition where the occupant of each of the vehicles sees the predetermined superimposed picture in the direction of the excitement region is established in accordance with a positional relationship between each of the vehicles and the excitement region.

Further, the present embodiment provides a delivery method including: an information detection step of detecting at least any information among sound information and picture information of an occupant who appreciates a content at a venue while riding on a vehicle and vehicle information which indicates a state of the vehicle; a transmission step of transmitting the information to a delivery apparatus which totalizes degrees of excitement of occupants with respect to a plurality of vehicles at the venue, the degrees of excitement being generated in accordance with the information; and a superimposition output step of outputting at least either one of a sound source of the content and a picture of the content, on which at least either one of a predetermined superimposed sound and a predetermined superimposed picture is superimposed, the predetermined superimposed sound and the predetermined superimposed picture being generated by the delivery apparatus based on the excitement degrees totalized by the delivery apparatus.

In which in the superimposition output step, an excitement region in which the occupant with a high excitement degree is positioned is specified by the delivery apparatus based on arrangement information of the vehicles parked at the venue, and the superimposed sound and the superimposed picture are output such that at least either one of a condition where the occupant hears the superimposed sound from a direction of the excitement region and a condition where the occupant sees the superimposed picture in the direction of the excitement region is established in accordance with a positional relationship between the vehicle and the excitement region.

DETAILED DESCRIPTION

Embodiments of the present invention will hereinafter be described with reference to drawings. In each of the drawings, the same reference signs are given to the same or corresponding elements, and for clarification of descriptions, repetitions of descriptions will be omitted as needed. Further, several reference signs are omitted such that the drawings do not become complicated.

First Embodiment

Figure 1:
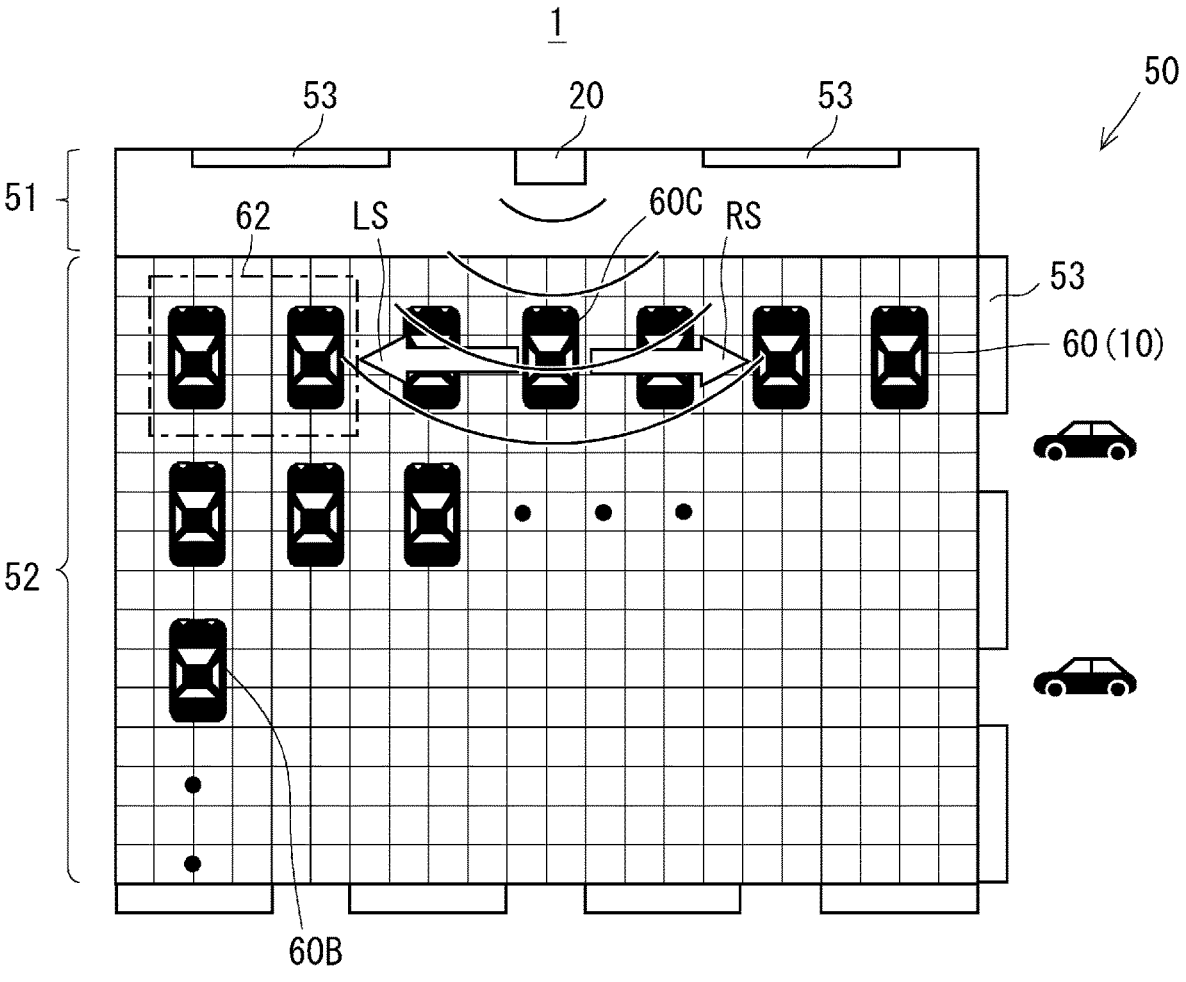
FIG. 1 is an outline diagram illustrating, as an example, a delivery system according to a first embodiment.

A delivery system according to a first embodiment will be described. FIG. 1 is an outline diagram illustrating, as an example, the delivery system according to the first embodiment. As illustrated in FIG. 1, a delivery system 1 is used in a venue such as a live performance venue 50, for example. In the following, a description will be made by using the live performance venue 50 as an example of the venue. The delivery system 1 includes a plurality of terminal apparatuses 10 and a delivery apparatus 20. The terminal apparatus 10 is arranged in each vehicle 60 in the live performance venue 50 at which a plurality of vehicles 60 are parked. The delivery apparatus 20 delivers contents such as live musical performance. In the following, a description will be made by using live performance as the contents. The terminal apparatus 10 receives live musical performance or the like and outputs the received musical performance or the like. In the following, a configuration of each of <live performance venue>, <terminal apparatus>, and <delivery apparatus> will be described, and <delivery method> will thereafter be described.

<Live Performance Venue>

The live performance venue 50 is a venue of a drive-in music live concert or festival at which the vehicle 60 is parked and a music live concert is enjoyed, for example.

Note that as long as the live performance venue 50 is a venue at which the vehicle 60 is parked and live performance is performed, the live performance venue 50 is not limited to the venue of the drive-in music live concert or festival. For example, the live performance is not limited to musical performance or the like but may be performance such as a theater play or a dance, sports such as a martial art or tennis, a lecture, a speech, and so forth, and the live performance venue 50 may be a venue where those are performed. As described above, at the venue such as the live performance venue 50, an occupant of the vehicle 60 can appreciate contents such as live performance while riding on the vehicle 60. The live performance venue 50 has a stage 51, a parking lot 52, and venue facilities 53.

The stage 51 is provided in the vicinity of the parking lot 52. For example, the stage 51 is provided to be adjacent to the parking lot 52. In FIG. 1, the stage 51 is provided on one side, and the parking lot 52 is provided on another side, but the parking lot 52 may surround a periphery of the stage 51, or the stage 51 may surround the parking lot 52.

On the stage 51, a performer performs live performance. For example, on the stage 51, a performer such as an artist performs music or the like by presenting a song or the like. Note that on the stage 51, the performer may perform performance such as a theater play or a dance, may perform sports such as a martial art or tennis, or may perform a lecture or a speech. Further, a large-sized screen or a display apparatus may be provided to the stage 51, and a movie of the live performance may be projected or displayed on that.

The parking lot 52 is provided in the vicinity of the stage 51. For example, the parking lot 52 is provided to be adjacent to the stage 51. At the parking lot 52, a plurality of vehicles 60 are parked. As illustrated in FIG. 1, the plurality of vehicles 60 may be parked in matrix-like arrangement or in irregular arrangement. An occupant is riding on the parked vehicle 60. One occupant or a plurality of occupants are possible. The occupant can see the live performance at the live performance venue 50 while riding on the vehicle 60.

The venue facility 53 includes a venue microphone, a venue speaker, a venue illumination device, a venue camera, and so forth, for example.

The venue microphone is arranged on the stage 51. A plurality of venue microphones may be arranged on the stage 51. The venue microphone collects a voice uttered by the performer or a sound of music performed by the performer. The venue microphone may be arranged in the parking lot 52. A plurality of venue microphones may be arranged in the parking lot 52. The venue microphone may collect a sound of a horn or the like of the vehicle.

The venue speaker is arranged on the stage 51. A plurality of venue speakers may be arranged on the stage 51. The venue speaker outputs a voice uttered by the performer and music performed by the performer while amplifying a sound volume of the voice and music. The venue speaker may be arranged in the parking lot 52. A plurality of venue speakers may be arranged in the parking lot 52.

The venue illumination device is arranged on the stage 51. A plurality of venue illumination devices may be arranged on the stage 51. The venue illumination device illuminates the performer on the stage 51. The venue illumination device may be arranged in the parking lot 52. A plurality of venue illumination devices may be arranged in the parking lot 52.

The venue camera captures an image of the stage 51 and the performer performing on the stage 51. A plurality of venue cameras may capture images of the stage 51 and the performer. The venue camera may capture an image of the parking lot 52 and the vehicle 60 parked at the parking lot 52. A plurality of venue cameras may capture images of the parking lot 52 and the vehicle 60.

<Terminal Apparatus>

Figure 2:
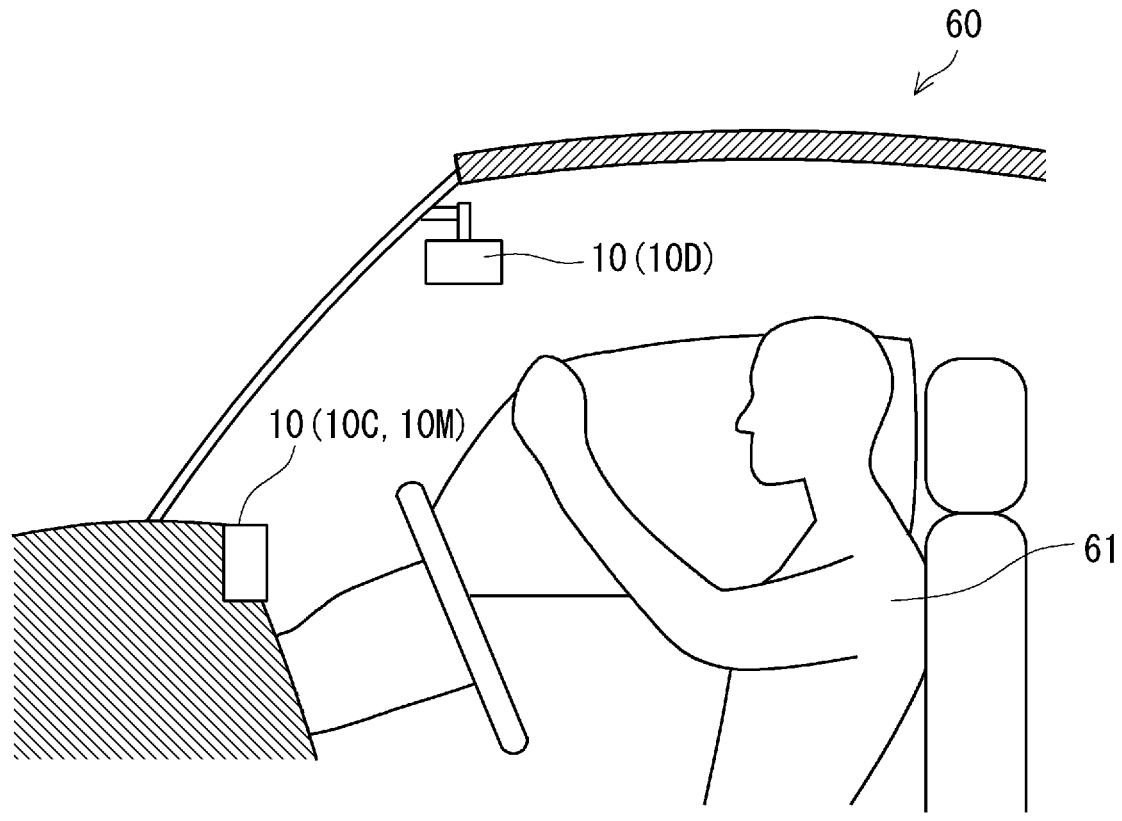
FIG. 2 is a diagram illustrating, as an example, a terminal apparatus according to the first embodiment.

FIG. 2 is a diagram illustrating, as an example, a terminal apparatus 10 according to the first embodiment. As illustrated in FIG. 2, the terminal apparatus 10 is arranged in a cabin of the vehicle 60 on which an occupant 61 is riding. The terminal apparatus 10 may be provided to a dashboard camera 10D, may be provided to an automotive navigation system 10C, or may be provided to a portable terminal 10M such as a smartphone or a tablet, for example. Thus, the dashboard camera 10D, the automotive navigation system 10C, and the portable terminal 10M may include the terminal apparatus 10. Further, each of the dashboard camera 10D, the automotive navigation system 10C, and the portable terminal 10M can be the terminal apparatuses 10.

Figure 3:
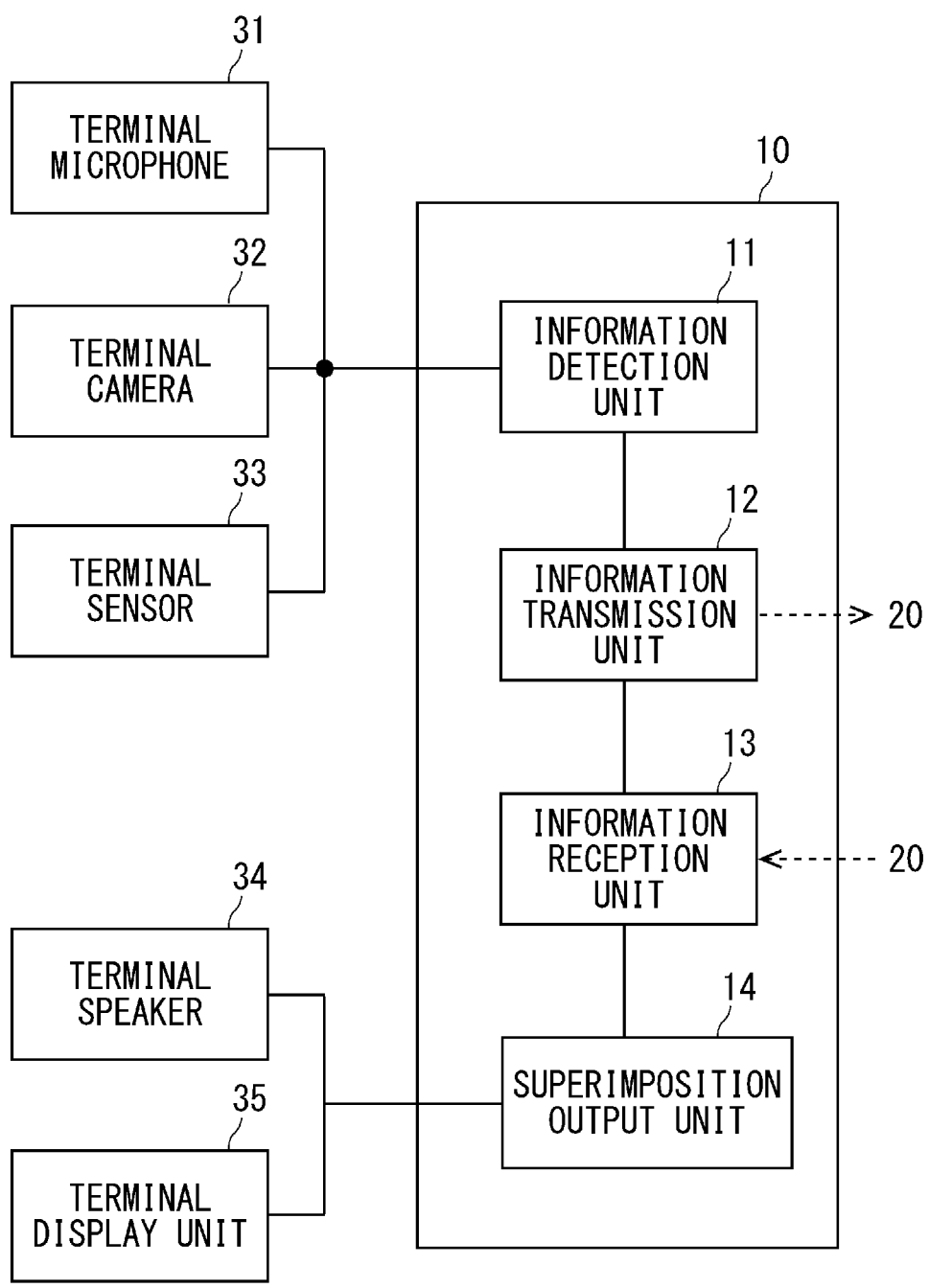
FIG. 3 is a block diagram illustrating, as an example, the terminal apparatus according to the first embodiment.

FIG. 3 is a block diagram illustrating, as an example, the terminal apparatus 10 according to the first embodiment. As illustrated in FIG. 3, the terminal apparatus 10 includes an information detection unit 11, an information transmission unit 12, an information reception unit 13, and a superimposition output unit 14.

The information detection unit 11 is connected with at least any of a terminal microphone 31, a terminal camera 32, and a terminal sensor 33 by a wired or wireless communication line. The terminal microphone 31 and the terminal camera 32 may be a microphone and a camera which are built in the dashboard camera 10D, the automotive navigation system 10C, the portable terminal 10M, and so forth or may be a microphone and a camera which are individually and externally attached as long as those are a microphone and a camera which are capable of being mounted on a vehicle.

The terminal microphone 31 detects sound information of the occupant 61 who sees the live performance while riding on the vehicle 60. The sound information includes a sound of the occupant 61 of the vehicle 60, for example. The sound information may include a volume of the sound of the occupant 61, a height of the sound, a length of the sound, and so forth. Further, the sound information may include sounds such as a yell, a singing voice, finger whistling, a laughing voice, a mutter, and a handclap of the occupant 61. As yells of the occupant 61, a voice calling the name of a live performer, "yeahhh!", "ohhh!", "encore!", and so forth can be included. Detection means of the sound information of the occupant 61 may recognize that the occupant 61 is speaking based on picture information of the occupant 61 and may thereby recognize a sound as the sound of the occupant 61.

The terminal camera 32 detects picture information of the occupant 61 who sees the live performance while riding on the vehicle 60. The picture information includes a picture of a motion of the body of the occupant. The picture information includes pictures of an action in which the occupant 61 of the vehicle 60 raises one hand, an action of raising both hands, an action of powerfully raising a fist, an action of hurraying while stretching both arms, an action of waving a hand, an action of swinging the head to left and right, an action of opening the mouth, an action of wiping away tears, and so forth, for example.

The terminal sensor 33 detects vehicle information which indicates a state of the vehicle 60. The vehicle information includes a horn of the vehicle 60, headlight flashing, steering information of a steering device, for example. The vehicle information may include various states of driving mechanisms such as an engine, a brake, an accelerator, and a steering wheel, lamplight mechanisms such as a lamp and a direction indicator, a detection mechanism of shaking of the vehicle by a G sensor, and in-cabin mechanisms such as an air conditioner and meters. The terminal sensor 33 may detect the vehicle information via a controller area network (CAN) of an in-vehicle network.

The information detection unit 11 detects at least any information among the sound information and the picture information of the occupant 61 who appreciates contents such as the live performance at the live performance venue 50 while riding on the vehicle 60 and the vehicle information which indicates the state of the vehicle 60 via the terminal microphone 31, the terminal camera 32, and the terminal sensor 33.

The information transmission unit 12 is connected with the delivery apparatus 20 by a wireless communication line such as Wi-Fi, for example. The information transmission unit 12 transmits at least any information among the detected sound information, picture information, and vehicle information to the delivery apparatus 20. The delivery apparatus 20 generates a predetermined superimposed sound and a predetermined superimposed picture based on the information transmitted by the information transmission unit 12. For example, the delivery apparatus 20 generates the predetermined superimposed sound and the predetermined superimposed picture from sounds and pictures which are stored in a storage apparatus or the like.

The predetermined superimposed sound includes cheers, for example. Note that the predetermined superimposed sound is not limited to cheers but may include at least any of a voice calling the name of a live performer, finger whistling, a laughing voice, and singing voices of a chorus by a plurality of persons. Further, the predetermined superimposed sound may be a sound which reflects actual cheers or may be a sound which is in advance prepared.

The predetermined superimposed picture may be a picture in which audiences wave their hands, a picture in which the audiences powerfully raise their fists, a picture in which the audiences swing their heads to left and right, may be a picture in which a spot light, a flash light, a penlight, and so forth flash on and off and rotate, or may be a picture in which confetti are flying. The predetermined superimposed picture may be a picture which is actually photographed, may be a picture which is created by computer graphics, or may be a picture which is in advance prepared.

The information reception unit 13 is connected with the delivery apparatus 20 by a wireless communication line. The information reception unit 13 receives, from the delivery apparatus 20, the predetermined superimposed sound and the predetermined superimposed picture which are generated by the delivery apparatus 20. The information reception unit 13 may receive a live sound source and a live picture from the delivery apparatus 20. The information reception unit 13 may receive the predetermined superimposed sound and the predetermined superimposed picture while superimposing those on the live sound source and the live picture.

As described above, the information reception unit 13 receives, from the delivery apparatus 20, at least either one of the predetermined superimposed sound and the predetermined superimposed picture, which are generated by the delivery apparatus 20 based on the information transmitted by the information transmission unit 12, while at least either one of the predetermined superimposed sound and the predetermined superimposed picture is superimposed on at least either one of the live sound source and the live picture. That is, the information reception unit 13 receives, from the delivery apparatus 20, a sound of contents and a picture of the contents, on which at least either one of the predetermined superimposed sound and predetermined superimposed picture generated by the delivery apparatus 20 is superimposed.

The superimposition output unit 14 is connected with at least either one of a terminal speaker 34 and a terminal display unit 35 by a wired or wireless communication line. The terminal speaker 34 and the terminal display unit 35 may be a speaker and a display unit which are built in the dashboard camera 10D, the automotive navigation system 10C, the portable terminal 10M, and so forth or may be a speaker and a display unit which are individually and externally attached as long as those are a speaker and a display which are capable of being mounted on a vehicle.

The terminal speaker 34 outputs the live sound source received from the delivery apparatus 20. The terminal speaker 34 outputs the predetermined superimposed sound received from the delivery apparatus 20. The terminal speaker 34 outputs a sound source of contents, on which the predetermined superimposed sound generated by the delivery apparatus 20 is superimposed, the predetermined superimposed sound being received from the delivery apparatus 20 by the information reception unit 13. Note that the terminal speaker 34 may output the live sound source via FM broadcasting. In such a case, the predetermined superimposed sound is output while being superimposed on the FM broadcasting.

The terminal display unit 35 is a display, a projector, or the like, for example. The display is a liquid crystal screen, for example. The display may be a display which is provided to the dashboard camera 10D, the automotive navigation system 10C, and the portable terminal 10M or may be a head-up display (HUD). The projector performs projection onto a front window, a side window, or the like, for example.

The terminal display unit 35 outputs the live picture received from the delivery apparatus 20. The terminal display unit 35 outputs the predetermined superimposed picture received from the delivery apparatus 20. The terminal display unit 35 outputs a picture of contents, on which the predetermined superimposed picture generated by the delivery apparatus 20 is superimposed, the predetermined superimposed picture being received from the delivery apparatus 20 by the information reception unit 13.

As described above, the superimposition output unit 14 outputs at least either one of the sound source of the contents and the picture of the contents, on which at least either one of the predetermined superimposed sound and predetermined superimposed picture received from the delivery apparatus 20 is superimposed.

Figure 4:
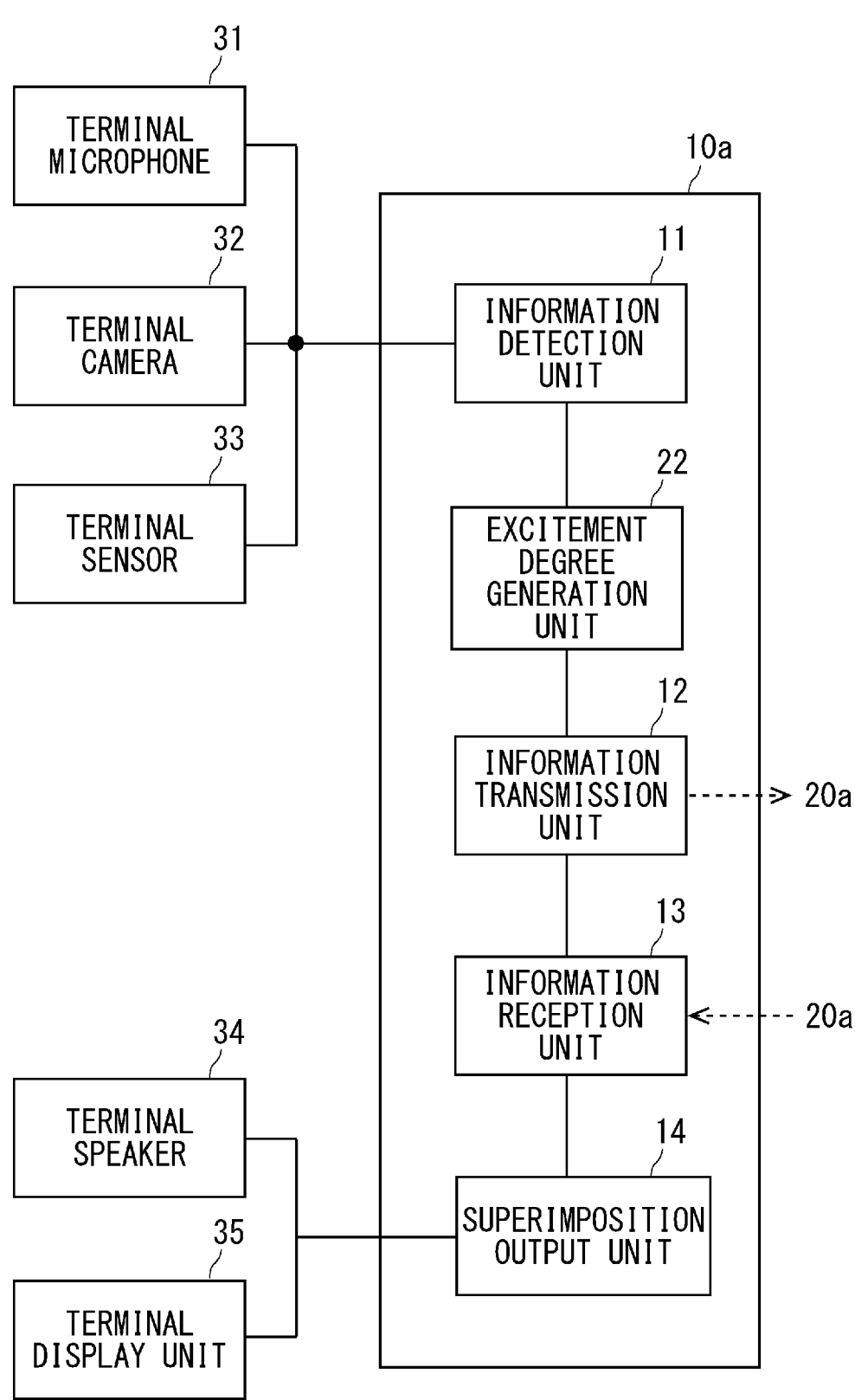
FIG. 4 is a block diagram illustrating, as an example, another terminal apparatus according to the first embodiment.

FIG. 4 is a block diagram illustrating, as an example, another terminal apparatus 10a according to the first embodiment. As illustrated in FIG. 4, the terminal apparatus 10a may include an excitement degree generation unit 22 which generates a degree of excitement of the occupant in accordance with information detected by the information detection unit 11. The excitement degree generation unit 22 will be described later. The information transmission unit 12 of the terminal apparatus 10a may transmit a generated excitement degree to a delivery apparatus 20a. Other units than the excitement degree generation unit 22 and the information transmission unit 12 in the terminal apparatus 10a are similar to those of the terminal apparatus 10.

<Delivery Apparatus>

The delivery apparatus 20 is arranged in the live performance venue 50, for example. The delivery apparatus 20 is connected with the terminal apparatus 10 by a wireless communication line. Further, the delivery apparatus 20 is connected with the venue facility 53 by a wired or wireless communication line. Note that the delivery apparatus 20 is not limited to that which is arranged in the live performance venue 50 but may be arranged in a predetermined place which is connected with the venue facility 53 by a wired or wireless communication line or may be arranged on a cloud which is connected with the venue facility 53 by a wired or wireless communication line. The delivery apparatus 20 may be connected with the plurality of vehicles 60 parked at the live performance venue 50 via the Internet.

Figure 5:
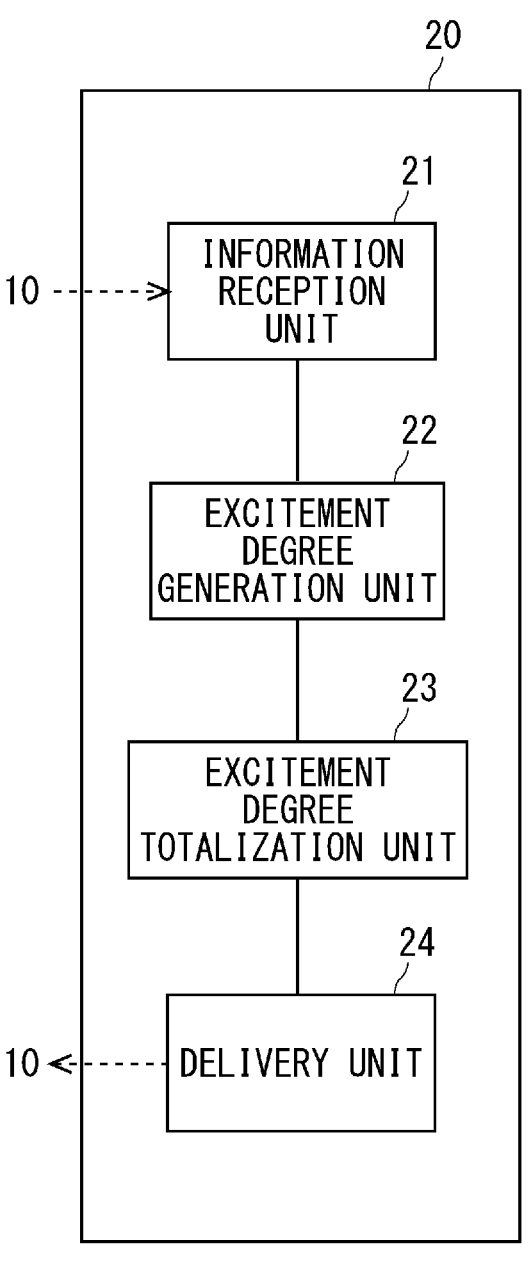
FIG. 5 is a block diagram illustrating, as an example, a delivery apparatus according to the first embodiment.

FIG. 5 is a block diagram illustrating, as an example, the delivery apparatus 20 according to the first embodiment. As illustrated in FIG. 5, the delivery apparatus 20 includes an information reception unit 21, the excitement degree generation unit 22, an excitement degree totalization unit 23, and a delivery unit 24.

The information reception unit 21 is connected with the information transmission unit 12 of the terminal apparatus 10 by a wireless communication line. The information reception unit 21 receives at least any information among the sound information, the picture information, and the vehicle information from the information transmission unit 12.

The excitement degree generation unit 22 generates the degree of excitement of the occupant 61 in accordance with at least any information among the received sound information, picture information, and vehicle information.

The excitement degree is an index which indicates how excited the occupant 61 is. For example, the excitement degree generation unit 22 generates the excitement degree from the sound information. The excitement degree generation unit 22 may generate the excitement degree in accordance with the sound volume of the sound produced by the occupant 61. The excitement degree may be increased as the sound volume of the sound produced by the occupant 61 is higher. Further, the excitement degree may be increased as a height of pitch of the sound produced by the occupant 61 is higher. In addition, the excitement degree may be increased as a length of the sound produced by the occupant is longer. The excitement degree may be generated in response to a specific word produced by the occupant 61.

For example, the excitement degree may be increased when the occupant 61 utters "the name of a performer", "yeah", "awesome", and so forth. Further, the excitement degree may be increased in accordance with a frequency of production of those words. Further, the excitement degree may be increased in a case where finger whistling by the occupant 61, a laughing voice, or singing voices of a chorus by a plurality of persons are present.

The excitement degree generation unit 22 may generate the excitement degree from the picture information. The excitement degree generation unit 22 may generate the excitement degree in accordance with a motion of the body of the occupant 61. For example, the excitement degree may be increased as the motion of the body of the occupant 61 is larger. Further, the excitement degree may be increased as the motion of the body of the occupant 61 is faster. In addition, the excitement degree may be increased in a case of a specific action such as powerfully raising a fist or swinging the head to left and right. Further, the excitement degree may be increased in accordance with a frequency of those actions.

The excitement degree generation unit 22 may generate the excitement degree from the vehicle information. The excitement degree generation unit 22 may generate the excitement degree in accordance with an action such as a horn, headlight flashing, or a steering operation. The excitement degree may be increased as a frequency of sounding of the horn and a frequency of headlight flashing are higher. The excitement degree may be increased as a frequency of operating the steering wheel is higher.

The excitement degree totalization unit 23 totalizes the respective excitement degrees of the occupants 61 of the plurality of vehicles 60 at the live performance venue 50. Specifically, the excitement degree totalization unit 23 totalizes the degrees of excitement of the occupants, the degrees of excitement being generated in accordance with at least any information among the sound information, the picture information, and the vehicle information, with respect to the plurality of vehicles 60 in the live performance venue 50. Further, the excitement degree totalization unit 23 specifies an excitement region in which the occupant 61 with a high excitement degree is positioned based on arrangement information of the vehicles 60 parked at the live performance venue 50.

For example, as illustrated in FIG. 1, in a case where more occupants 61 with high excitement degrees are positioned on a left side LS than a right side RS when seen from a vehicle 60C arranged at a center of the parking lot 52, the excitement degree totalization unit 23 specifies a region on the left side LS as an excitement region 62.

The delivery unit 24 delivers, to each of the vehicles 60, the predetermined superimposed sound and the predetermined superimposed picture, which correspond to the totalized excitement degrees. Further, the delivery unit 24 may deliver the live sound source and the live picture to the vehicle 60. Thus, the delivery unit 24 may deliver, to each of the vehicles 60, at least either one of the predetermined superimposed sound and the predetermined superimposed picture, which correspond to the excitement degrees, while superimposing at least either one of the predetermined superimposed sound and the predetermined superimposed picture on at least either one of the live sound source and the live picture. That is, the delivery unit 24 delivers, to each of the terminal apparatuses 10, the live sound source and the live picture, on which at least either one of the predetermined superimposed sound and the predetermined superimposed picture is superimposed, the predetermined superimposed sound and predetermined superimposed picture being generated based on the totalized excitement degrees of the vehicles 60. Consequently, the information reception unit 13 of the terminal apparatus 10 receives, from the delivery apparatus 20, the live sound source and the live picture, on which at least either one of the predetermined superimposed sound and the predetermined superimposed picture is superimposed, the predetermined superimposed sound and predetermined superimposed picture being generated by the delivery apparatus 20 based on the excitement degrees totalized by the delivery apparatus 20. The superimposition output unit 14 of the terminal apparatus 10 outputs at least either one of the live sound source and the live picture, on which at least either one of the predetermined superimposed sound and the predetermined superimposed picture generated by the delivery apparatus 20 is superimposed, the predetermined superimposed sound and superimposed picture being received by the information reception unit 13.

The delivery unit 24 may deliver a superimposed sound and a superimposed picture to each of the vehicles 60 such that at least either one of a condition where the occupant 61 of each of the vehicles 60 hears the superimposed sound from a direction of the excitement region 62 and a condition where the occupant 61 of each of the vehicles 60 sees the superimposed picture in the direction of the excitement region 62 is established in accordance with a positional relationship between each of the vehicles 60 and the excitement region 62. Consequently, the superimposition output unit 14 of each of the terminal apparatus 10 outputs the superimposed sound and the superimposed picture such that at least either one of the condition where the occupant 61 of each of the vehicles 60 hears the superimposed sound from the direction of the excitement region 62 and the condition where the occupant 61 of each of the vehicles 60 sees the superimposed picture in the direction of the excitement region 62 is established in accordance with the positional relationship between the vehicle 60 and the excitement region 62.

For example, as illustrated in FIG. 1, in accordance with the positional relationship between the vehicle 60C and the excitement region 62, the delivery unit 24 delivers the live sound source on which the superimposed sound is superimposed such that the occupant 61 of the vehicle 60C hears cheers from a direction of the left side LS. Accordingly, the superimposition output unit 14 outputs the live sound source on which the superimposed sound is superimposed such that the cheers are heard from the direction of the left side LS. Further, the delivery unit 24 delivers the live picture on which the superimposed picture is superimposed such that powerfully raised fists of the audiences or penlights are seen in the direction of the left side LS. Accordingly, the superimposition output unit 14 outputs the live picture on which the superimposed picture is superimposed such that the powerfully raised fists of the audiences or the penlights are seen in the direction of the left side LS.

Further, in accordance with a positional relationship between a vehicle 60B arranged in a rear area of the parking lot 52 and the excitement region 62, the delivery unit 24 delivers the live sound source on which the superimposed sound is superimposed such that the occupant 61 of the vehicle 60B hears the cheers from a front area. Accordingly, the superimposition output unit 14 outputs the live sound source on which the superimposed sound is superimposed such that the cheers are heard from the front area. Further, the delivery unit 24 delivers the live picture on which the superimposed picture is superimposed such that the powerfully raised fists of the audiences or the penlights are seen in the front area. Accordingly, the superimposition output unit 14 outputs the live picture on which the superimposed picture is superimposed such that the powerfully raised fists of the audiences or the penlights are seen in the front area.

Figure 6:
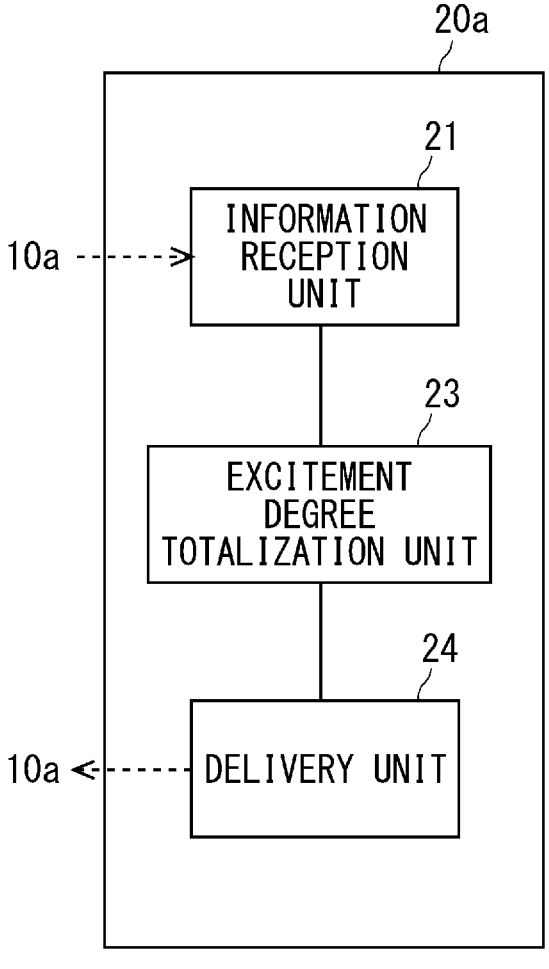
FIG. 6 is a block diagram illustrating, as an example, another delivery apparatus according to the first embodiment.

FIG. 6 is a block diagram illustrating, as an example, another delivery apparatus 20a according to the first embodiment. In a case where the terminal apparatus 10a includes the excitement degree generation unit 22 as illustrated in FIG. 4, the delivery apparatus 20a may not include the excitement degree generation unit 22 as illustrated in FIG. 6. In such a case, the information reception unit 21 of the delivery apparatus 20a receives, from the terminal apparatus 10a, the excitement degree generated by the excitement degree generation unit 22 of the terminal apparatus 10a. Other units than the excitement degree generation unit 22 and the information reception unit 21 in the delivery apparatus 20a are similar to those of the delivery apparatus 20.

As described above, the delivery system 1 of the present embodiment detects at least any information among the sound information and the picture information of the occupant 61 who sees the live performance at the live performance venue 50 while riding on the vehicle 60 and the vehicle information which indicates the state of the vehicle 60. The delivery system 1 generates the degree of excitement of the occupant 61 in accordance with the sound information, the picture information, and the vehicle information and totalizes the respective excitement degrees of the plurality of vehicles 60 in the live performance venue 50. At least either one of the predetermined superimposed sound and the predetermined superimposed picture, which correspond to the totalized excitement degrees, is superimposed on at least either one of the live sound source and the live picture. Accordingly, the occupant 61 of the vehicle 60 can appreciate the live sound source and the live picture on which at least either one of the predetermined superimposed sound and the predetermined superimposed picture is superimposed.

<Delivery Method>

Figure 7:
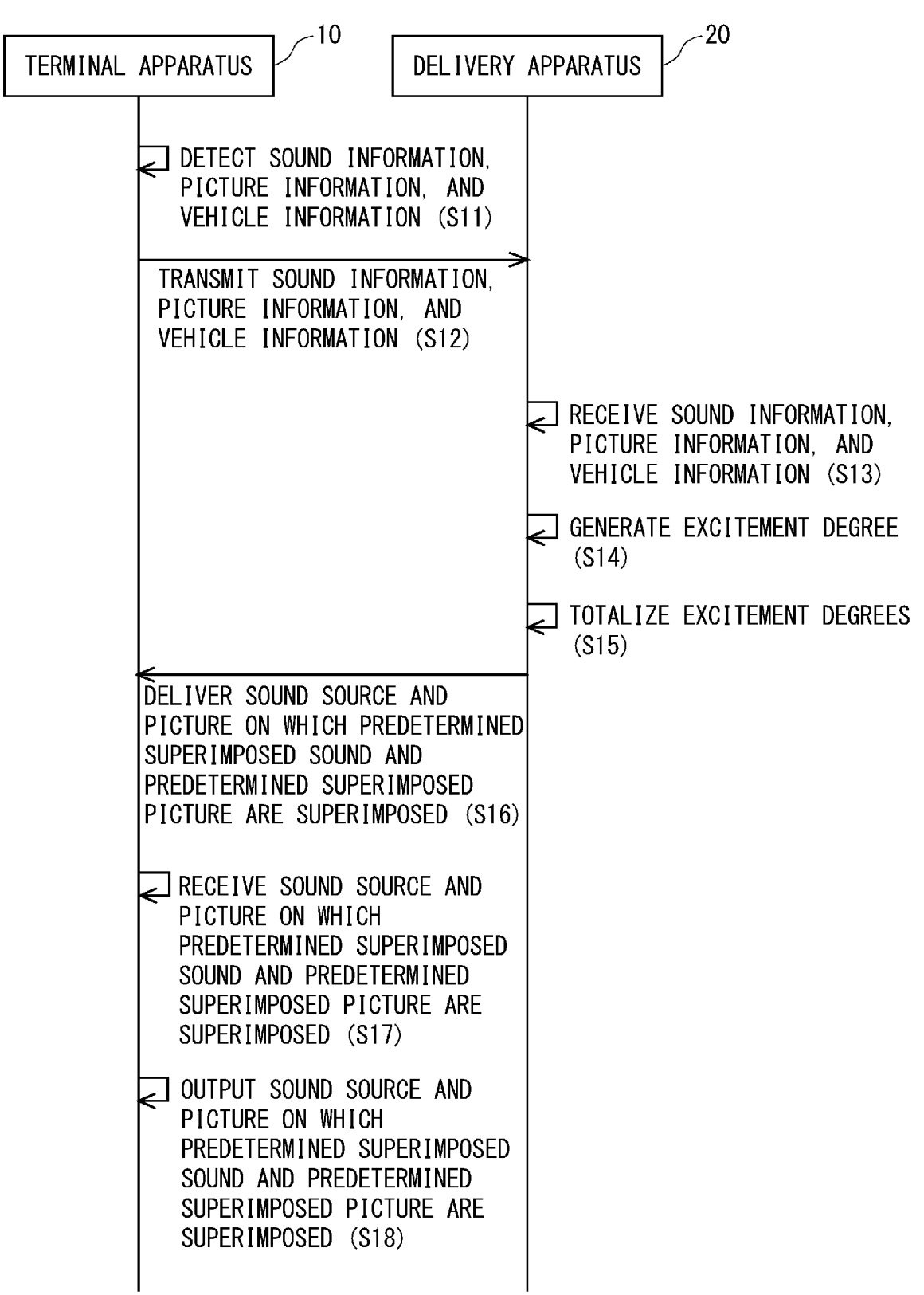
FIG. 7 is a sequence diagram illustrating, as an example, a delivery method of the delivery system according to the first embodiment.

Next, a delivery method as an action of the delivery system 1 will be described. FIG. 7 is a sequence diagram illustrating, as an example, the delivery method of the delivery system 1 according to the first embodiment.

As indicated in step S11 in FIG. 7, the terminal apparatus 10 detects the sound information, the picture information, and the vehicle information. Specifically, the information detection unit 11 of the terminal apparatus 10 detects at least any information among the sound information, the picture information, and the vehicle information of the occupant 61 who sees the live performance at the live performance venue 50 while riding on the vehicle 60.

Next, as indicated in step S12, the terminal apparatus 10 transmits the sound information, the picture information, and the vehicle information to the delivery apparatus 20. Specifically, the information transmission unit 12 of the terminal apparatus 10 transmits at least any information among the detected sound information, picture information, and vehicle information to the information reception unit 21 of the delivery apparatus 20.

Next, as indicated in step S13, the delivery apparatus 20 receives the sound information, the picture information, and the vehicle information. Specifically, the information reception unit 21 of the delivery apparatus 20 receives at least any information among the sound information, the picture information, and the vehicle information which are transmitted from the terminal apparatus 10.

Next, as indicated in step S14, the delivery apparatus 20 generates the excitement degree. Specifically, the excitement degree generation unit 22 of the delivery apparatus 20 generates the degree of excitement of the occupant 61 of the vehicle 60 in accordance with at least any of the sound information, the picture information, and the vehicle information.

Next, as indicated in step S15, the delivery apparatus 20 totalizes the excitement degrees. Specifically, the excitement degree totalization unit 23 of the delivery apparatus 20 totalizes the respective excitement degrees of the occupants 61 of the plurality of vehicles 60 in the live performance venue 50. Note that in step S15, the excitement degree totalization unit 23 may specify the excitement region 62 in which the occupant 61 with a high excitement degree is positioned based on the arrangement information of the vehicles 60 parked at the live performance venue 50.

Next, as indicated in step S16, the delivery apparatus 20 delivers the live sound source and the live picture on which the predetermined superimposed sound and the predetermined superimposed picture are superimposed. Specifically, the delivery unit 24 of the delivery apparatus 20 generates the predetermined superimposed sound and the predetermined superimposed picture based on the totalized excitement degrees and delivers, to each of the vehicles 60, the live sound source and the live picture, on which at least either one of the generated predetermined superimposed sound and predetermined superimposed picture is superimposed. Note that in step S16, the delivery unit 24 may deliver the predetermined superimposed sound and the predetermined superimposed picture to each of the vehicles 60 such that at least either one of the condition where the occupant 61 of each of the vehicles 60 hears the superimposed sound from the direction of the excitement region 62 and the condition where the occupant 61 of each of the vehicles 60 sees the superimposed picture in the direction of the excitement region 62 is established in accordance with the positional relationship between each of the vehicles 60 and the excitement region 62.

Next, as indicated in step S17, the terminal apparatus 10 receives the live sound source and the live picture on which the predetermined superimposed sound and the predetermined superimposed picture are superimposed. Specifically, the information reception unit 13 of the terminal apparatus 10 receives, from the delivery apparatus 20, the live sound source and the live picture, on which at least either one of the predetermined superimposed sound and predetermined superimposed picture generated by the delivery unit 24 is superimposed.

Next, as indicated in step S18, the terminal apparatus 10 outputs the live sound source and the live picture on which the predetermined superimposed sound and the predetermined superimposed picture are superimposed. Specifically, the superimposition output unit 14 of the terminal apparatus 10 outputs at least either one of the live sound source and the live picture, on which at least either one of the received predetermined superimposed sound and predetermined superimposed picture is superimposed.

Figure 8:
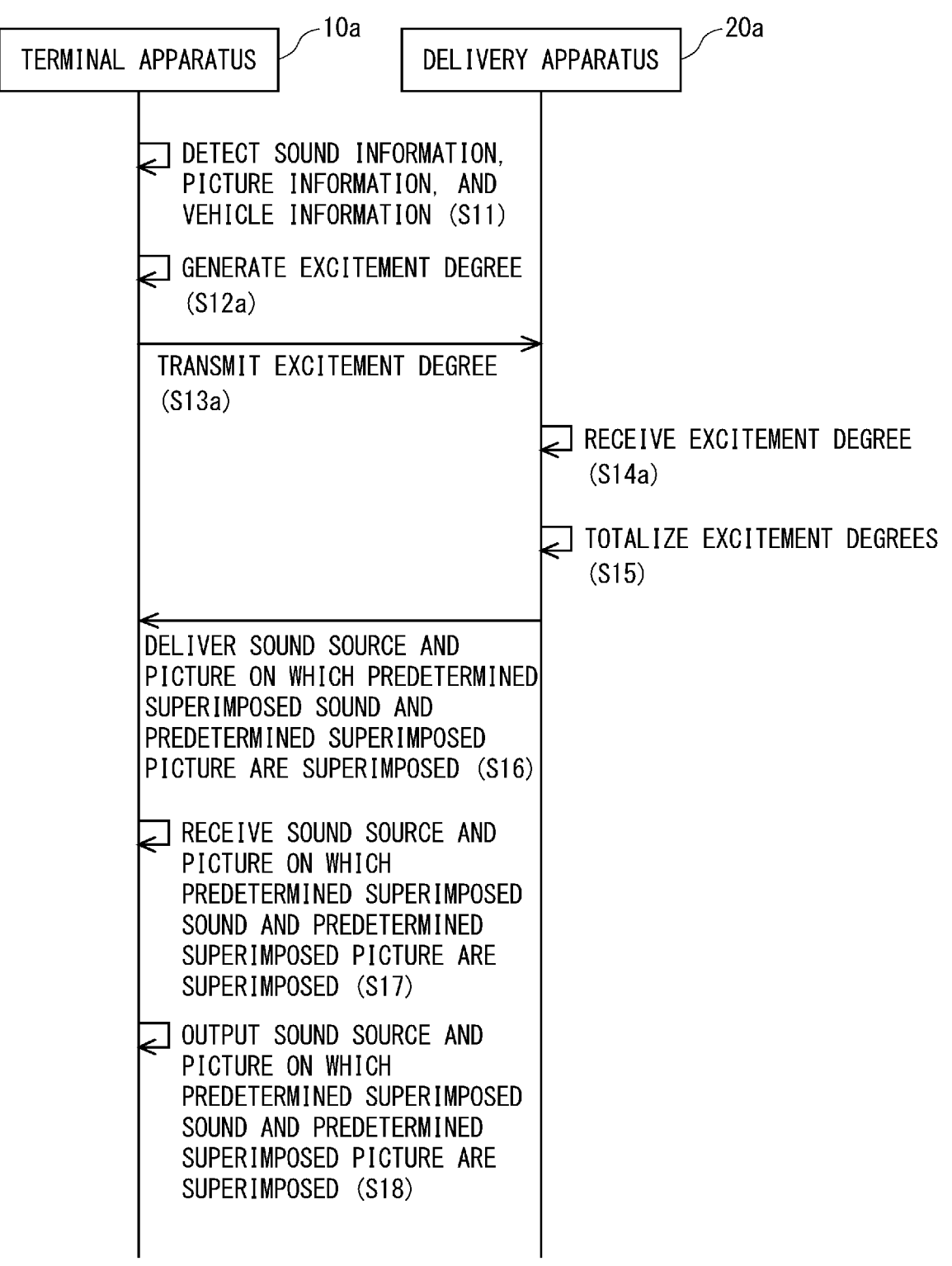
FIG. 8 is a sequence diagram illustrating, as an example, a delivery method of another delivery system according to the first embodiment.

FIG. 8 is a sequence diagram illustrating, as an example, a delivery method of another delivery system according to the first embodiment. In the other delivery system which includes the terminal apparatus 10a and the delivery apparatus 20a, the terminal apparatus 10a has the excitement degree generation unit 22. In this case, the delivery apparatus 20a may not have the excitement degree generation unit 22. Thus, as indicated in step S12a in FIG. 8, the excitement degree generation unit 22 of the terminal apparatus 10a generates the excitement degree in accordance with the information detected by the information detection unit 11. As indicated in step S13a, the information transmission unit 12 of the terminal apparatus 10a transmits the generated excitement degree to the delivery apparatus 20a. Then, as indicated in step S14a, the information reception unit 21 of the delivery apparatus 20a receives the transmitted excitement degree. Actions of the terminal apparatus 10a and the delivery apparatus 20a other than those are similar to actions of the terminal apparatus 10 and the delivery apparatus 20.

As described above, in the delivery method of the present embodiment, at least any information is detected among the sound information and the picture information of the occupant 61 who sees the live performance at the live performance venue while riding on the vehicle 60 and the vehicle information which indicates the state of the vehicle 60. The degree of excitement of the occupant 61 is generated in accordance with the sound information, the picture information, and the vehicle information, and the detected information is transmitted to the delivery apparatus 20 which totalizes the respective excitement degrees of the plurality of vehicles 60 in the live performance venue 50. At least either one of the live sound source and the live picture is output, on which at least either one of the predetermined superimposed sound and the predetermined superimposed picture is superimposed, the predetermined superimposed sound and the predetermined superimposed picture being generated by the delivery apparatus 20 based on the totalized excitement degrees. When at least either one of the live sound source and the live picture with the superimposition is output, based on the arrangement information of the vehicles 60 parked at the live performance venue 50, the excitement region 62 in which the occupant 61 with a high excitement degree is positioned may be specified by the delivery apparatus 20. In such a case, the superimposed sound and the superimposed picture are output such that at least either one of the condition where the occupant 61 hears the superimposed sound from the direction of the excitement region 62 and the condition where the occupant 61 sees the superimposed picture in the direction of the excitement region 62 is established in accordance with the positional relationship between the vehicle 60 and the excitement region 62.

Figure 9:
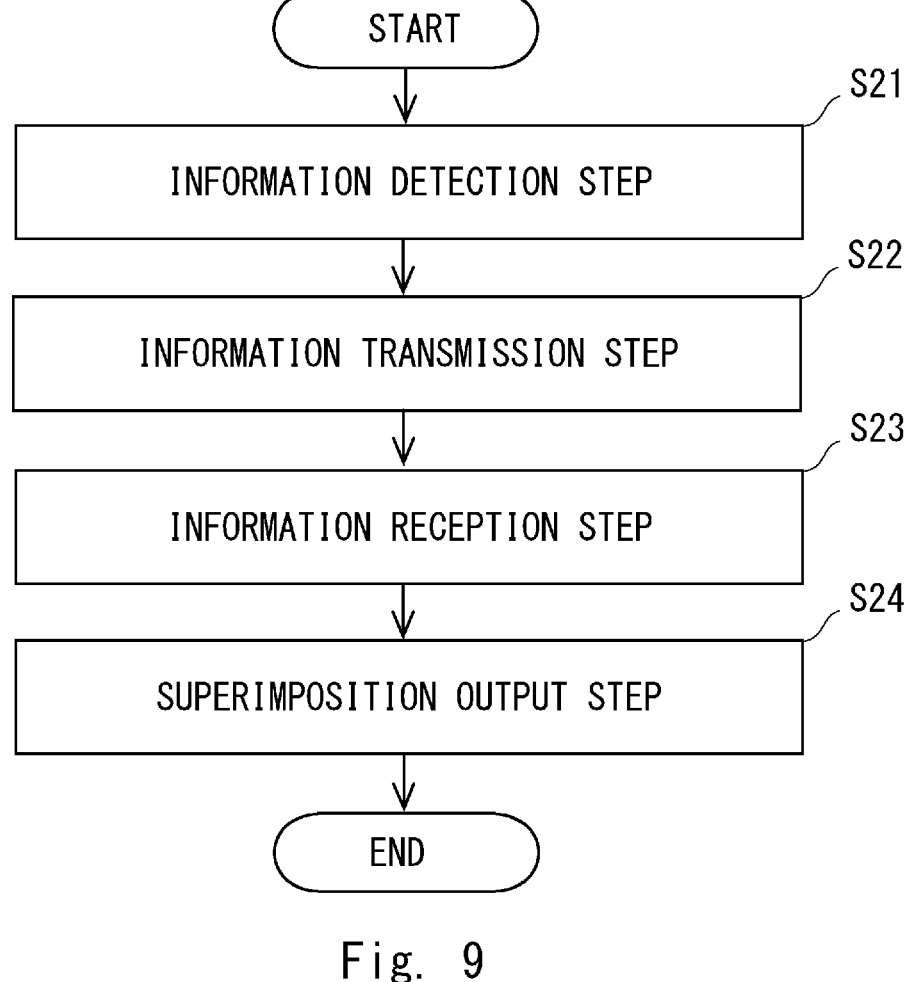
FIG. 9 is a flowchart illustrating, as an example, a delivery method of the terminal apparatus according to the first embodiment.

FIG. 9 is a flowchart illustrating, as an example, a delivery method of the terminal apparatus 10 according to the first embodiment. As illustrated in FIG. 9, the delivery method of the terminal apparatus 10 has an information detection step S21, an information transmission step S22, an information reception step S23, and a superimposition output step S24.

First, in the information detection step S21, the information detection unit 11 of the terminal apparatus 10 detects at least any information among the sound information, the picture information, and the vehicle information of the occupant 61 who sees the live performance at the live performance venue 50 while riding on the vehicle 60.

Next, in the information transmission step S22, the information transmission unit 12 of the terminal apparatus 10 transmits, to the delivery apparatus 20, at least any information among the detected sound information, picture information, and vehicle information.

Next, in the information reception step S23, the information reception unit 13 of the terminal apparatus 10 receives the live sound source and the live picture, on which the predetermined superimposed sound and predetermined superimposed picture transmitted from the delivery apparatus 20 are superimposed. Specifically, the information reception unit 13 receives the live sound source and the live picture, on which at least either one of the predetermined superimposed sound and the predetermined superimposed picture is superimposed, the predetermined superimposed sound and predetermined superimposed picture being generated by the delivery apparatus 20 based on the excitement degrees totalized by the delivery apparatus 20.

Next, in the superimposition output step S24, the superimposition output unit 14 of the terminal apparatus 10 outputs the live sound source and the live picture on which the received predetermined superimposed sound and predetermined superimposed picture are superimposed. Specifically, the superimposition output unit 14 outputs the live sound source and the live picture, on which at least either one of the predetermined superimposed sound and predetermined superimposed picture generated by the delivery apparatus 20 is superimposed. Note that in the superimposition output step S24, the excitement region 62 in which the occupant 61 with a high excitement degree is positioned may be specified by the delivery apparatus 20 based on the arrangement information of the vehicles 60 parked at the live performance venue 50. The superimposed sound and the superimposed picture may be output such that at least either one of the condition where the occupant 61 hears the superimposed sound from the direction of the excitement region 62 and the condition where the occupant 61 sees the superimposed picture in the direction of the excitement region 62 is established in accordance with the positional relationship between the vehicle 60 and the excitement region 62. In such a manner, the terminal apparatus 10 receives and outputs the live performance.

Figure 10:
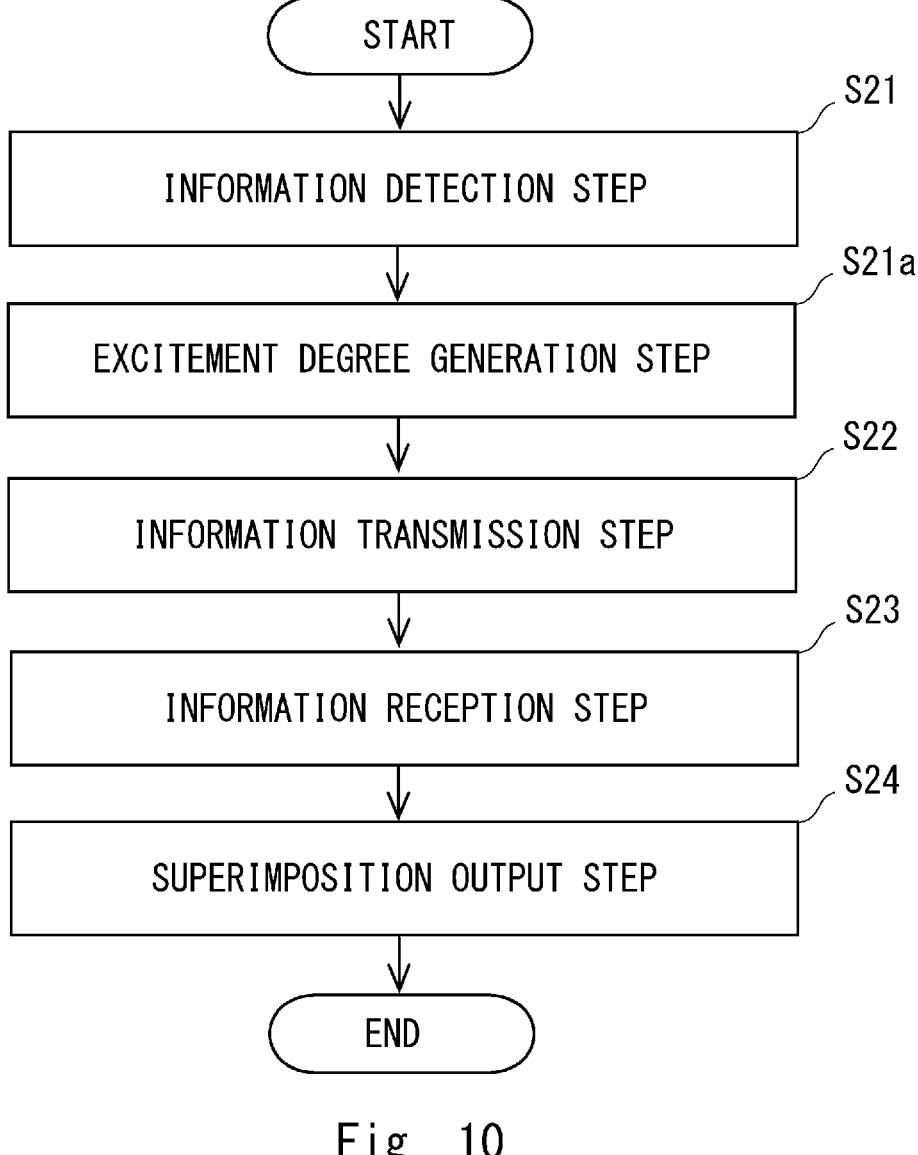
FIG. 10 is a flowchart illustrating, as an example, a delivery method of the other terminal apparatus according to the first embodiment.

FIG. 10 is a flowchart illustrating, as an example, a delivery method of the other terminal apparatus 10a according to the first embodiment. As indicated in step S21a in FIG. 10, the terminal apparatus 10a may have the excitement degree generation unit 22 and generate the excitement degree in accordance with the detected information. In such a case, in the information transmission step S22, the information transmission unit 12 of the terminal apparatus 10a transmits the generated excitement degree to the delivery apparatus 20a. Actions of the terminal apparatus 10a other than those are similar to actions of the terminal apparatus 10.

Figure 11:
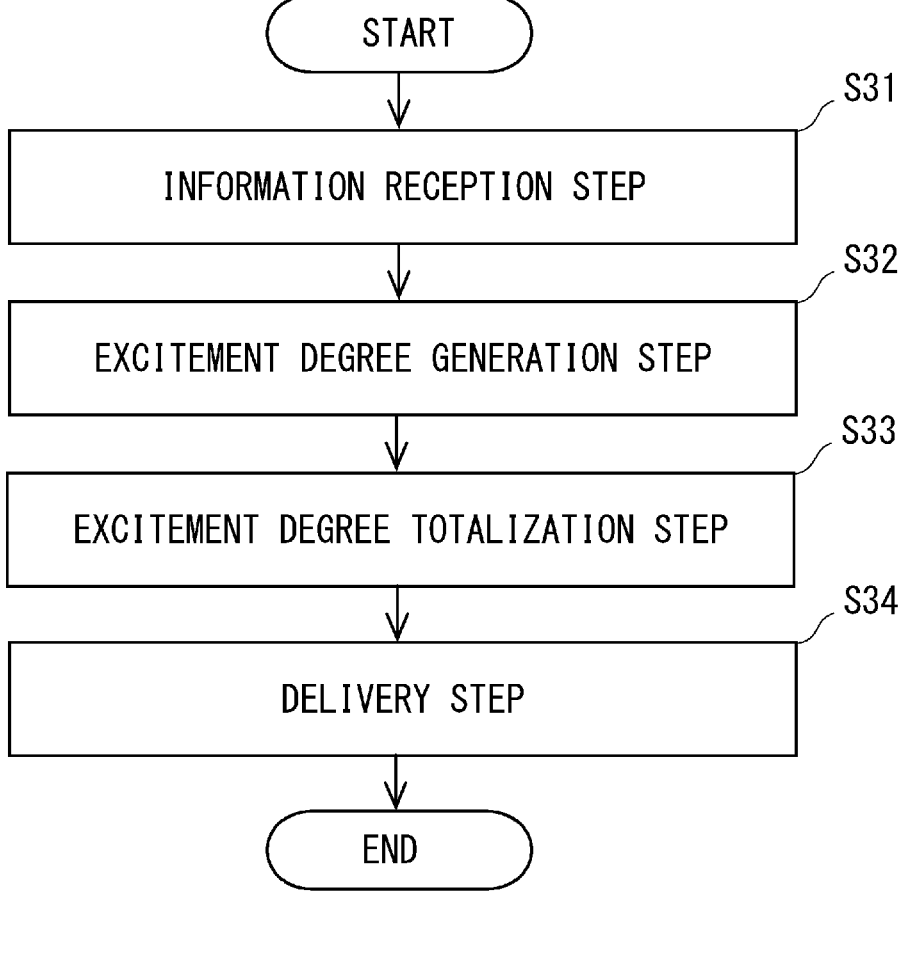
FIG. 11 is a flowchart illustrating, as an example, a delivery method of the delivery apparatus according to the first embodiment.

FIG. 11 is a flowchart illustrating, as an example, a delivery method of the delivery apparatus 20 according to the first embodiment. As illustrated in FIG. 11, the delivery method of the delivery apparatus 20 has an information reception step S31, an excitement degree generation step S32, an excitement degree totalization step S33, and a delivery step S34.

First, in the information reception step S31, the information reception unit 21 of the delivery apparatus 20 receives at least any information among the sound information, the picture information, and the vehicle information of the occupant 61 who sees the live performance at the live performance venue 50 while riding on the vehicle 60.

Next, in the excitement degree generation step S32, the excitement degree generation unit 22 of the delivery apparatus 20 generates the degree of excitement of the occupant 61 in accordance with at least any of the sound information, the picture information, and the vehicle information.

Next, in the excitement degree totalization step S33, the excitement degree totalization unit 23 of the delivery apparatus 20 totalizes the respective excitement degrees of the occupants 61 of the plurality of vehicles 60 at the live performance venue 50. In the excitement degree totalization step S33, the excitement region 62 in which the occupant 61 with a high excitement degree is positioned may be specified based on the arrangement information of the vehicles 60 parked at the live performance venue 50.

Next, in the delivery step S34, the delivery unit 24 of delivery apparatus 20 delivers, to each of the vehicles 60, at least either one of the predetermined superimposed sound and the predetermined superimposed picture, which correspond to the totalized excitement degrees, while superimposing at least either one of the predetermined superimposed sound and the predetermined superimposed picture on at least either one of the live sound source and the live picture. That is, the delivery unit 24 generates at least either one of the predetermined superimposed sound and the predetermined superimposed picture based on the excitement degrees totalized by the excitement degree totalization unit 23. The delivery unit 24 delivers, to each of the vehicles 60, the live sound source and the live picture on which the generated predetermined superimposed sound and predetermined superimposed picture are superimposed. In the delivery step S34, the superimposed sound may be delivered while being superimposed on the live sound source such that the occupant 61 of each of the vehicles 60 hears the superimposed sound from the direction of the excitement region in accordance with the positional relationship between each of the vehicles 60 and the excitement region 62. Further, the superimposed picture may be delivered while being superimposed on the live picture such that the occupant 61 of each of the vehicles 60 sees the superimposed picture in the direction of the excitement region.

Figure 12:
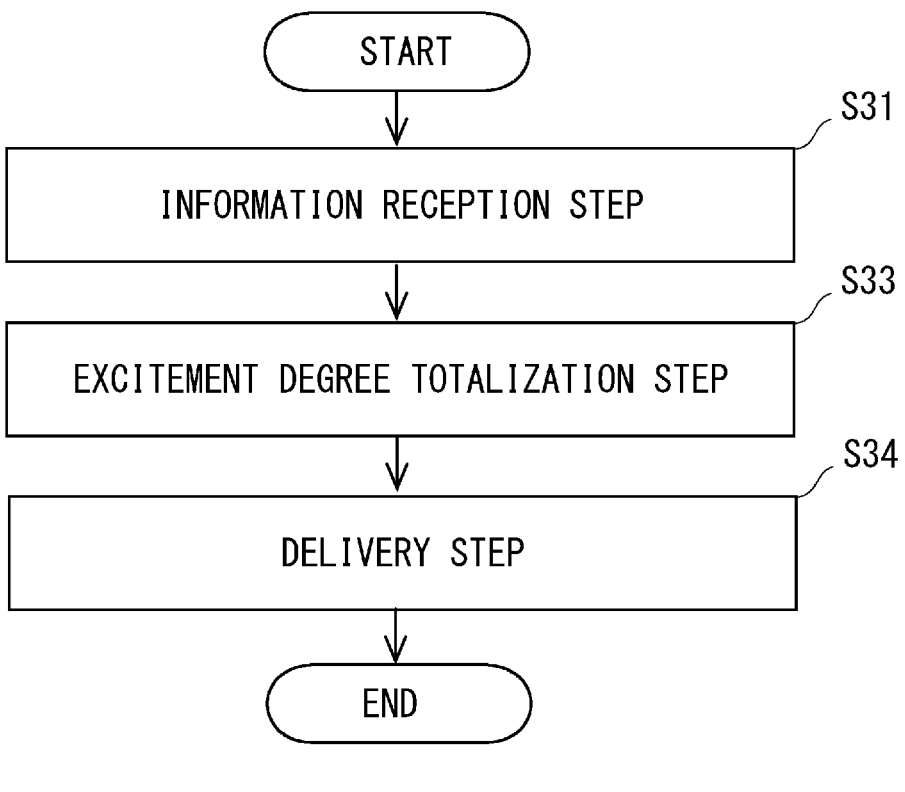
FIG. 12 is a flowchart illustrating, as an example, a delivery method of the other delivery apparatus according to the first embodiment.

FIG. 12 is a flowchart illustrating, as an example, a delivery method of the other delivery apparatus 20a according to the first embodiment. As illustrated in FIG. 12, the other delivery apparatus 20a may not have the excitement degree generation step. In this case, in the information reception step S31, the information reception unit 21 of the delivery apparatus 20a receives the excitement degree from the terminal apparatus 10a. Actions of the delivery apparatus 20a other than those are similar to actions of the delivery apparatus 20.

Next, effects of the present embodiment will be described. The delivery system 1 of the present embodiment superimposes the predetermined superimposed sound and the predetermined superimposed picture on the live sound source and the live picture, the predetermined superimposed sound and predetermined superimposed picture corresponding to the excitement degree of the occupant 61 who appreciates contents such as live performance at a venue such as the live performance venue 50 while riding on the vehicle 60. Thus, a sense of presence or a sense of unity in a music live concert or the like can be improved while the occupant 61 of the vehicle 60 maintains a certain distance from another person.

The delivery system 1 generates the degree of excitement of the occupant 61 in accordance with the sound information, the picture information, and the vehicle information of the occupant 61 who appreciates the contents such as the live performance while riding on the vehicle 60. Thus, the excitement degree of the occupant 61 can accurately be perceived. Further, the delivery system 1 totalizes the respective excitement degrees of the occupants 61 of the plurality of vehicles 60 at the live performance venue 50 and can thus accurately perceive the excitement degree of the occupant 61 relative to the other vehicles 60. Thus, the excitement region 62 in the live performance venue 50 can accurately be perceived.

The superimposed sound is delivered to the vehicle 60 such that the occupant 61 of the vehicle 60 hears the superimposed sound from the direction of the excitement region 62. Further, the superimposed picture is delivered to the vehicle 60 such that the occupant 61 of the vehicle 60 sees the superimposed picture in the direction of the excitement region 62. Thus, a sense of presence can be improved. Further, the excitement degree can be expressed which correspond to a positional relationship between the excitement region 62 and an own vehicle, and a sense of presence can thereby be improved by directivity of excitement to be felt by the occupant 61.

The delivery apparatus 20 may provide feedback to the whole live performance venue 50 in accordance with the excitement degrees of the occupants 61 who see the live performance. For example, the delivery apparatus 20 may cause the venue speaker and the venue illumination device of the venue facility 53, the screen, and the display apparatus to output the predetermined superimposed sound and the predetermined superimposed picture which correspond to the excitement degrees. In this manner also, a sense of presence or a sense of unity in the music live concert or the like can be improved.

Figure 13:
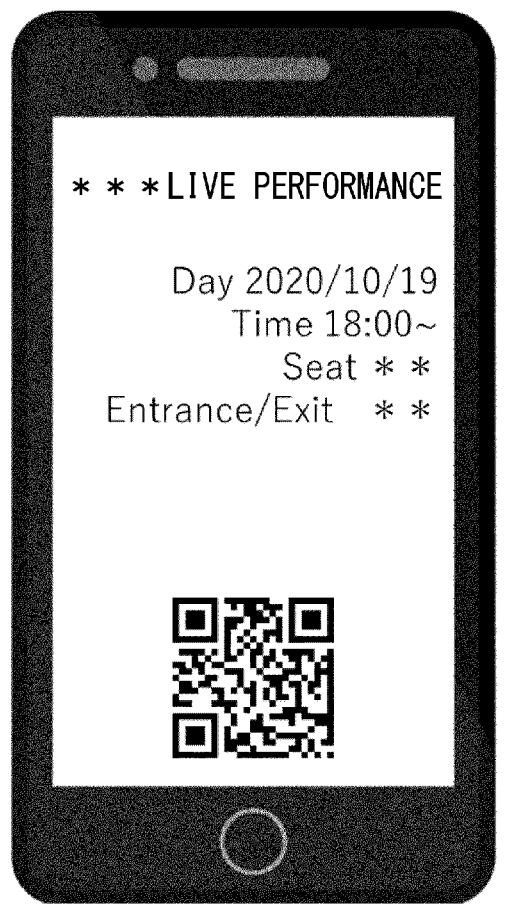
FIG. 13 is a diagram illustrating, as an example, an electronic ticket according to the first embodiment.
Figure 14:
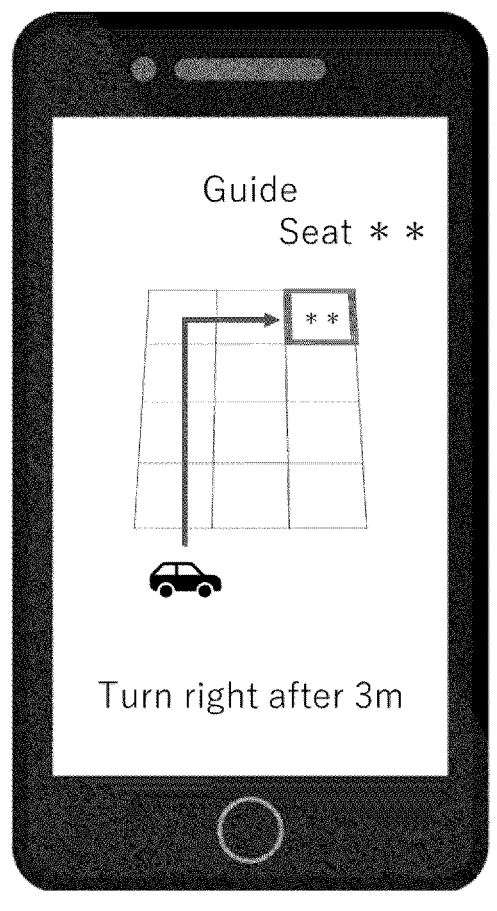
FIG. 14 is a diagram illustrating, as an example, a guide map of a parking lot according to the first embodiment.

Next, a description will be made about a method in which the excitement degree totalization unit 23 of the delivery apparatus 20 acquires arrangement positions of the plurality of vehicles 60. FIG. 13 is a diagram illustrating, as an example, an electronic ticket according to the first embodiment. FIG. 14 is a diagram illustrating, as an example, a guide map of the parking lot 52 according to the first embodiment. As illustrated in FIG. 13 and FIG. 14, for example, the occupant 61 of the vehicle 60 is notified of a parking position of the vehicle 60 by the electronic ticket which is displayed on a display screen of the portable terminal 10M such as a smartphone. Further, the occupant 61 parks the vehicle 60 at the parking position in accordance with the guide map which is displayed on the display screen. The delivery apparatus 20 acquires such information of the parking position of the vehicle 60. Accordingly, the excitement degree totalization unit 23 of the delivery apparatus 20 can use the arrangement positions of the plurality of vehicles 60 for totalization.

Note that display of the electronic ticket and the guide map is not limited to the portable terminal 10M but may be performed on the automotive navigation system 10C and the dashboard camera 10D.

Second Embodiment

Next, a delivery system according to a second embodiment will be described. In the above-described first embodiment, the delivery unit 24 of the delivery apparatus 20 delivers, to the terminal apparatus 10, the live sound source and the live picture on which the predetermined superimposed sound and the predetermined superimposed picture are superimposed; however, in the present embodiment, the delivery unit 24 of the delivery apparatus 20 delivers the totalized excitement degrees, the live sound source, and the live picture to the terminal apparatus 10. Meanwhile, the information reception unit 13 of the terminal apparatus 10 receives the totalized excitement degrees, the live sound source, and the live picture from the delivery apparatus 20. The superimposition output unit 14 of the terminal apparatus 10 outputs the predetermined superimposed sound and the predetermined superimposed picture, which correspond to the totalized excitement degrees, while superimposing those on the live sound source and the live picture.

As described above, in the first embodiment, the delivery unit 24 of the delivery apparatus 20 superimposes the predetermined superimposed sound and the predetermined superimposed picture on the live sound source and the live picture; however, in the second embodiment, the superimposition output unit 14 of the terminal apparatus 10 superimposes the predetermined superimposed sound and the predetermined superimposed picture on the live sound source and the live picture. In the present embodiment, the terminal apparatus 10 may generate the predetermined superimposed sound and the predetermined superimposed picture. For example, the terminal apparatus 10 may generate the predetermined superimposed sound and the predetermined superimposed picture from sounds and pictures which are stored in a storage apparatus.

In the present embodiment also, a sense of presence or a sense of unity in the music live concert or the like can be improved while the occupant 61 of the vehicle 60 maintains a certain distance from another person. Configurations, actions, and effects other than those are included in the description of the first embodiment.

Note that the present invention is not limited to the above first and second embodiments but can appropriately be modified without departing from the scope of the gist thereof. For example, combinations of each configuration of the first and second embodiments are also included in the scope of the technical ideas of the embodiments. Further, a delivery apparatus, a terminal apparatus, a delivery method, and a delivery program which will be described in the following are included in the scope of the technical ideas of the embodiments.

(Supplementary Note 1)

A delivery apparatus including:

an information reception unit configured to receive at least any information among sound information and picture information of an occupant who sees live performance at a live performance venue while riding on a vehicle and vehicle information which indicates a state of the vehicle;

an excitement degree generation unit configured to generate a degree of excitement of the occupant in accordance with the received information;

an excitement degree totalization unit configured to totalize respective excitement degrees of occupants of a plurality of vehicles in the live performance venue; and a delivery unit configured to deliver, to each of the vehicles, at least either one of a predetermined superimposed sound and a predetermined superimposed picture, which correspond to the totalized excitement degrees, while superimposing at least either one of the predetermined superimposed sound and the predetermined superimposed picture on at least either one of a sound source of the live performance and a picture of the live performance.

(Supplementary Note 2)

The delivery apparatus described in the supplementary note 1, in which the excitement degree totalization unit specifies an excitement region in which the occupant with a high excitement degree is positioned based on arrangement information of the vehicles parked at the live performance venue, and the delivery unit delivers, to each of the vehicles, the superimposed sound and the superimposed picture such that at least either one of a condition where the occupant of each of the vehicles hears the superimposed sound from a direction of the excitement region and a condition where the occupant of each of the vehicles sees the superimposed picture in the direction of the excitement region is established in accordance with a positional relationship between each of the vehicles and the excitement region.

(Supplementary Note 3)

A delivery method of a delivery apparatus, the delivery method including:

an information reception step of receiving at least any information among sound information and picture information of an occupant who sees live performance at a live performance venue while riding on a vehicle and vehicle information which indicates a state of the vehicle;

an excitement degree generation step of generating a degree of excitement of the occupant in accordance with the received information;

an excitement degree totalization step of totalizing respective excitement degrees of occupants of a plurality of vehicles in the live performance venue; and a delivery step of delivering, to each of the vehicles, at least either one of a predetermined superimposed sound and a predetermined superimposed picture, which correspond to the totalized excitement degrees, while superimposing at least either one of the predetermined superimposed sound and the predetermined superimposed picture on at least either one of a sound source of the live performance and a picture of the live performance.

The present invention can suitably be applied to a delivery system used in a live performance venue or the like.

What is claimed is:

1. A terminal apparatus including a computer provided in an on-vehicle device, the terminal apparatus comprising:

a processor of the computer coupled to a memory storing instructions for the processor to execute:

an information detection unit configured to detect at least any information among sound information and picture information of an occupant who appreciates a content at a venue while riding on a vehicle and vehicle information which indicates a state of the vehicle;

an information transmission unit configured to transmit the information to a delivery apparatus which totalizes degrees of excitement of occupants with respect to a plurality of vehicles at the venue, the degrees of excitement being generated in accordance with the information;

an information reception unit configured to receive, from the delivery apparatus, a sound source of the content and a picture of the content, on which at least either one of a predetermined superimposed sound and a predetermined superimposed picture is superimposed, the predetermined superimposed sound and the predetermined superimposed picture being generated by the delivery apparatus based on the excitement degrees totalized by the delivery apparatus; and a superimposition output unit configured to output at least either one of the sound source of the content and the picture of the content which are received, wherein an excitement region in which the occupant with a high excitement degree is positioned is specified by the delivery apparatus based on arrangement acquired by notifying a portable terminal of the occupant of an electronic ticket including information indicating a parking position to be parked by the vehicle at the venue, and the superimposition output unit outputs the superimposed sound and the superimposed picture such that at least either one of a condition where the occupant hears the superimposed sound from a direction of the excitement region and a condition where the occupant sees the superimposed picture in the direction of the excitement region is established in accordance with a positional relationship between the vehicle and the excitement region.

2. The terminal apparatus according to claim 1, wherein the predetermined superimposed sound includes at least any of cheers, a voice calling a name of a performer of the content, finger whistling, a laughing voice, and singing voices of a chorus by a plurality of persons.

3. A delivery system comprising:

a terminal apparatus being arranged in each vehicle in a venue at which a plurality of vehicles are parked, the terminal apparatus including a computer provided in an on-vehicle device, the terminal apparatus having a processor coupled to a memory storing instructions for the processor to execute an information detection unit configured to detect at least any information among sound information and picture information of an occupant who appreciates a content while riding on the vehicle and vehicle information which indicates a state of the vehicle; and a delivery apparatus including a computer connected with a venue facility by a wired or wireless communication line, the delivery apparatus applying the processor to execute an excitement degree totalization unit configured to totalize degrees of excitement of occupants with respect to the plurality of vehicles, the degrees of excitement being generated in accordance with the information, the excitement degree totalization unit being configured to specify an excitement region in which the occupant with a high excitement degree is positioned based on arrangement information acquired by notifying a portable terminal of the occupant of an electronic ticket including information indicating a parking position to be parked by the vehicle at the venue, wherein the delivery apparatus further applies the processor to execute a delivery unit configured to deliver, to each of the terminal apparatuses, a sound source of the content and a picture of the content, on which at least either one of a predetermined superimposed sound and a predetermined superimposed picture is superimposed, the predetermined superimposed sound and the predetermined superimposed picture being generated based on the totalized excitement degrees of the vehicles, and each of the terminal apparatuses further applies the processor to execute a superimposition output unit configured to output the superimposed sound and the superimposed picture such that at least either one of a condition where the occupant of each of the vehicles hears the predetermined superimposed sound from a direction of the excitement region and a condition where the occupant of each of the vehicles sees the predetermined superimposed picture in the direction of the excitement region is established in accordance with a positional relationship between each of the vehicles and the excitement region.

4. A delivery method comprising:

an information detection step of detecting at least any information among sound information and picture information of an occupant who appreciates a content at a venue while riding on a vehicle and vehicle information which indicates a state of the vehicle;

a transmission step of transmitting the information to a delivery apparatus which totalizes degrees of excitement of occupants with respect to a plurality of vehicles in the venue, the degrees of excitement being generated in accordance with the information; and a superimposition output step of outputting at least either one of a sound source of the content and a picture of the content, on which at least either one of a predetermined superimposed sound and a predetermined superimposed picture is superimposed, the predetermined superimposed sound and the predetermined superimposed picture being generated by the delivery apparatus based on the excitement degrees totalized by the delivery apparatus, wherein in the superimposition output step, an excitement region in which the occupant with a high excitement degree is positioned is specified by the delivery apparatus based on arrangement information acquired by notifying a portable terminal of the occupant of an electronic ticket including of information indicating a parking position to be parked by the vehicle at the venue, and the superimposed sound and the superimposed picture are output such that at least either one of a condition where the occupant hears the superimposed sound from a direction of the excitement region and a condition where the occupant sees the superimposed picture in the direction of the excitement region is established in accordance with a positional relationship between the vehicle and the excitement region.

* * * * *